INVENTOR.
GEORGE E. GLOVER

United States Patent Office 3,194,630
Patented July 13, 1965

3,194,630
PROCESS FOR THE RECOVERY OF A FERRIC-FLUORIDE COMPLEX AND/OR A BERYLLIUM COMPOUND
George E. Glover, Philadelphia, Pa., assignor to Crane Co., Chicago, Ill., a corporation of Illinois
Filed Jan. 11, 1962, Ser. No. 165,695
9 Claims. (Cl. 23—88)

This invention relates to a method and apparatus for the treatment of fluoride-containing water, and is particularly concerned with a well-known procedure for recovery of beryllium oxide from beryl.

In accordance with the patent to Kawecki No. 2,312,297, dated February 23, 1943, beryl is roasted with sodium ferric fluoride to produce the soluble sodium beryllium fluoride. This is leached from the roasted mixture and precipitated with sodium hydroxide and then heated to produce beryllium oxide. The fluorine involved is in an alkaline solution which is acidified and treated with ferric sulphate to produce the sodium ferric fluoride which is used in the process. The precipitation of the sodium ferric fluoride leaves substantial amounts of fluoride in solution in large amounts of water, along with sodium sulphate, and the fluoride content is such that the liquor cannot be discharged to sewers. Furthermore, the fluoride content cannot be removed economically by anion exchange because of the large amount of sodium sulphate present. Accordingly, it has been the practice to run the waste water into a detention pond in which lime is added for the purpose of precipitating calcium fluoride. The calcium fluoride, however, is either appreciably soluble in water, or its formation is incomplete, possibly due to the fact that the sulphates present also react with the lime, or the lime is not sufficiently dispersed to come into contact with all of the fluoride ions. As a result of the preceding, surface waters or ground water (near the earthen lagoons in which the calcium fluorides are usually stored) become polluted by toxic fluorides.

Furthermore, very large quantities of water are thus wasted, being unsuitable for return to the process.

In accordance with the present invention the objections indicated have been overcome: necessity for special disposal of fluoride wastes is eliminated, wastes from the process involving, at worst, only minute amounts of fluoride which may be disposed of without objection; the process water is largely recovered in such pure form that it may be returned to the process; and the source of iron may be the relatively inexpensive magnetite, although iron or another iron oxide may be used.

The objects of the invention indicated in the foregoing, and others relating to details of procedure and arrangement of apparatus, will become more apparent from the following description, read in conjunction with the accompanying drawing, in which.

Figures 1, 2:
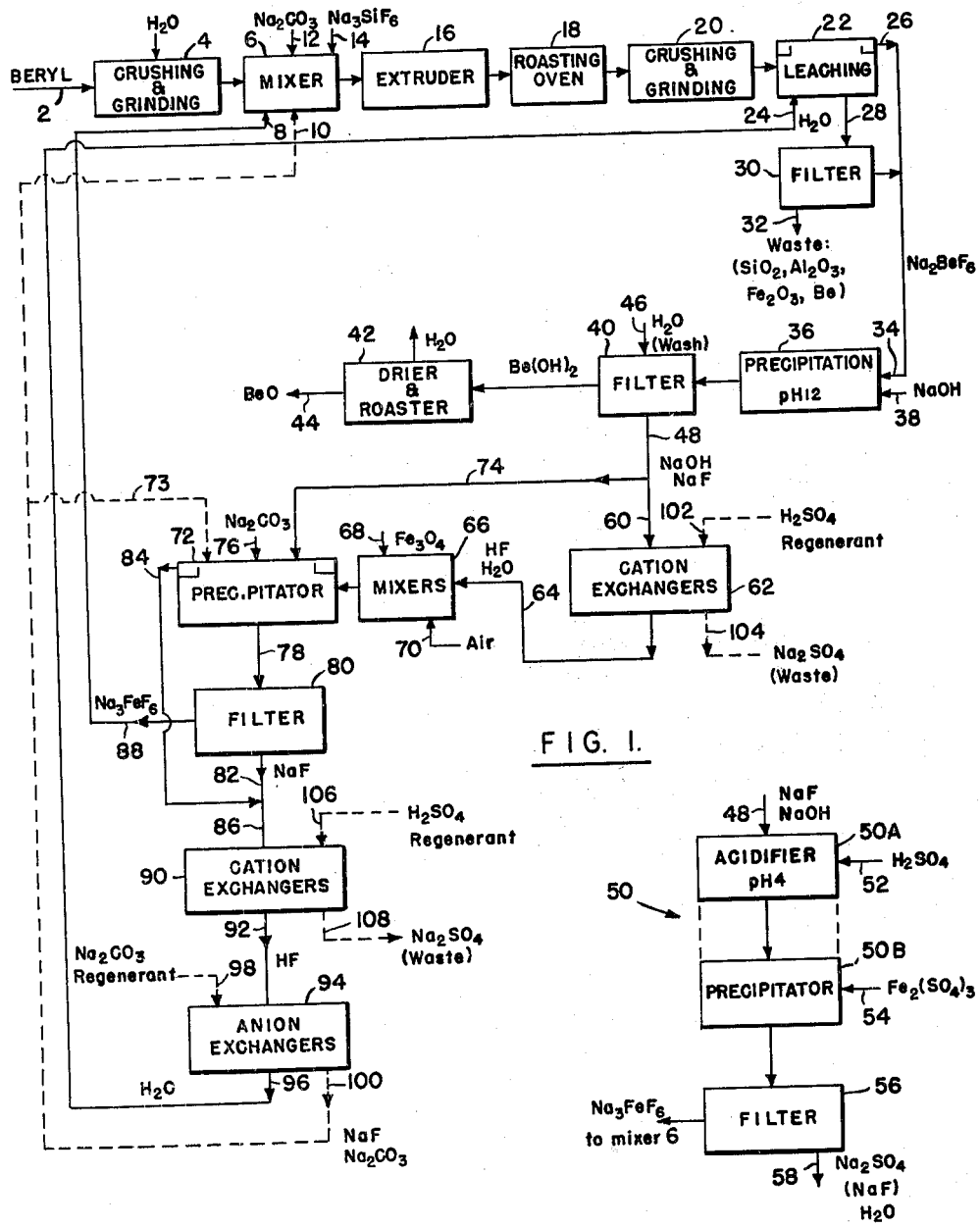
FIGURE 1 is a flow diagram illustrating the improved process and apparatus.
FIGURE 2 is a fragmentary flow diagram illustrating, for comparison, the prior art.

In considering FIGURE 1 it is to be understood that, for simplicity, various obvious steps, such as washing of filter precipitates, washing of ion exchangers, matters of mechanical procedure such as agitation, etc., are omitted, since the detailed techniques are common in the art and will be well understood by those involved therein. Furthermore, apparatus details are not illustrated because the component apparatus elements are in themselves conventional and may take various forms dependent entirely upon choice: for example, filters may be of any desired types considered most suitable under particular circumstances or depending upon the quantities of materials handled, and whether the process is carried out to some extent as a batch process or is carried out as a continuous process. Furthermore, again for simplicity, certain of the blocks in the diagram represent several pieces of apparatus where such several pieces are associated in the known art. The interconnecting lines represent pipe lines, pumps or conveyors such as are obviously appropriate.

The upper portion of FIGURE 1 shows what is basically the apparatus and process steps in accordance with the Kawecki patent. The present process embodies this as a part. The Kawecki process will be first described to provide a better understanding of the novel aspects and advantages of the present invention.

Beryl is introduced at 2 to crushing and grinding apparatus 4 which in actual practice normally consists of successive stages of apparatus. Water is here introduced for wet grinding. The finely ground beryl is then introduced to a mixer 6. To this there is added at 8 sodium ferric fluoride (though in the prior art not from the source indicated in FIGURE 1). In accordance with the process of the present invention sodium fluoride and sodium carbonate enter the mixer at 10 in solution as described more fully later. In the prior art there is added sodium carbonate as indicated at 12 and sodium silicofluoride as indicated at 14. Both of these latter additions may also occur in accordance with the present invention. Following complete mixing of the constituents, the "mud" is extruded by an exturder 16 to provide briquets for introduction into the roasting oven where heating occurs for a long period at a temperature desirably around 750° C. As a result of this roasting there is a conversion of the beryl, which is a beryllium aluminum silicate, by the sodium ferric fluoride into sodium beryllium fluoride, ferric oxide, alumina and silica. This mixture is then crushed and ground in the apparatus indicated at 20, and delivered to the leaching tank 22 in which the sodium beryllium fluoride is dissolved. The leaching requires large quantities of water introduced as indicated at 24. In accordance with the prior art this water is brought from outside the process. Clear supernatant solution is taken from the leaching tank at 26. The suspension of insoluble materials passes at 28 to the filter 30 and the filtrate, a solution of sodium beryllium fluoride joins the solution from 26. The filter cake discharged at 32 is generally discarded because it is not economical to recover the iron and aluminum contents. This waste cake is indicated as containing beryllium, the beryllium here being merely that which is not further economically recoverable.

At 34 the sodium beryllium fluoride solution enters a precipitation tank 36 into which there is introduced sodium hydroxide at 38 to produce a pH of around 12 which is suitable for the precipitation of beryllium hydroxide. The suspension passes to a filter 40 where the beryllium hydroxide is separated from the remaining solution, being then delivered to a dryer and roaster 42 wherein dehydration occurs to provide the final beryllium oxide at 44. In the filter 40 washing of the beryllium hydroxide cake is effected by water added at 46. The effluent from the filter at 48 is an aqueous solution of sodium hydroxide and sodium fluoride.

Comparison of the foregoing with the Kawecki patent will reveal that what has been described is essentially what is involved in the process of that patent. Since this part of the process is entirely conventional, it is unnecessary to go into further details which are fully disclosed in the patent. What the present invention is particularly concerned with is the handling of the effluent at 48, and before continuing the description of FIGURE 1 it will be informative to consider FIGURE 2 which represents what has been done with this effluent.

The effluent 48 containing, it will be noted, substantially all of the water introduced at the leaching tank, was introduced into a tank indicated at 50 which is illustrated in FIGURE 2 as comprising two parts in view of the fact that successive steps take place therein. In effect the single tank first acted as an acidifier 50A into which sulfuric acid was introduced at 52 to secure a pH value of about 4, suitable for the precipitation indicated at 50B involving the introduction at 54 of ferric sulphate. Here sodium ferric fluoride was precipitated and removed in the filter 56. In the prior procedure this sodium ferric fluoride was returned to the process by introduction into mixer 6. The filtrate contained sodium sulphate in considerable quantity in the process water. The sodium fluoride content was not completely removed since the precipitation of sodium ferric fluoride was not complete, and the amount of fluoride remaining in solution was sufficient to require the special treatment with lime as described above. However, as above indicated, the lime treatment did not transform the fluoride completely into an insoluble substance, and hence there occurred the objectionable contamination of surface and ground waters. Because of the presence of large quantities of sodium sulphate, anion exchange could not be used to remove the fluoride ions since the exchanger would be required to remove the sulphate ions as well or to discriminate against the sulphate ions. In the former case, the total exchange capacity required would be prohibitively large. In the latter case, the effluent of the anion exchanger would contain sulphates which would prohibit the successful recovery of this effluent as leach water at 24 into the tank 22, inasmuch as these sulphates would solubilize other components of the ore. Furthermore, because of the large sulphate content the water could not be returned to the process and had to be wasted. It will be noted that if return was effected the sulphate content would be cumulative.

In accordance with the present invention, therefore, returning to FIGURE 1, the effluent at 48 is otherwise treated. Some of this effluent is delivered at 60 to cation exchangers 62. (In some cases a single exchanger might be used but, in accordance with usual practice, a plurality of exchangers is desirable to maintain operation of the main stream in one while one or more others are undergoing regeneration.) The cation exchangers contain a strong base cation exchanger typified by Rohm and Haas IR–120 or Nalco HCR–W, though other strongly acidic cation exchangers may be used. In the exchangers the sodium ion is absorbed and the effluent at 64 is an aqueous solution of hydrofluoric acid. This is introduced to mixers (desirably operated in pairs) to which iron or an iron oxide is added at 68, desirably with the introduction of air at 70. Agitation is desirably here used, and the iron or iron oxide is rapidly transformed to ferric fluoride, the air serving to oxidize to the ferric state the metallic iron or ferrous oxide in any mixture of iron oxides used. In all events ferric fluoride is the product either in complete or partial solution, complete solution being unnecessary.

It will be noted that what is involved here eliminates the necessity for introduction of preformed ferric sulphate, with the special advantage that sulphate ion is not involved.

The ferric fluoride with the water is then introduced into precipitator 72 into which the remaining effluent 48 is also introduced through line 74. Sodium carbonate is here added at 76 to make up for the removal of sodium in the cation exchangers 62. In the precipitator there is thus formed sodium ferric fluoride. The added sodium carbonate is in such quantity as to produce an acidic condition (for example pH 4) optimum for the formation of the sodium ferric fluoride.

At this point reference may be made to the proportioning of the separated stream of effluent 48 at 60 and 74. To reduce the demand on the cation exchangers 62, only so much transformation of sodium fluoride into hydrofluoric acid is accomplished as is sufficient for the solution of the proper amount of the iron oxide. The proportion of the flow at 74 to that at 60, for example, may be in the ratio of 40 to 58 by volume. The magnetite is added substantially in its theoretical proportion (as to iron content) depending upon the fluoride concentration.

From the precipitator the suspension is delivered at 78 to the filter 80, and the filtrate at 82 may be combined with the clear supernatant liquor from the precipitator overflowing at 84, the combined liquor containing sodium fluoride being as indicated at 86. The filter cake of sodium ferric fluoride is delivered at 88 and introduced at 8 into the mixer 6.

The sodium fluoride solution at 86 is introduced into the cation exchangers 90 which may contain the same type of cation exchange resin as in the exchangers 62. The effluent at 92 is a solution of hydrofluoric acid.

In order to provide recovery of the fluorine, this solution is then introduced to anion exchangers 94 which may contain any suitable anion exchange material for removal of the fluorine ions. The effluent from the anion exchangers at 96 is substantially deionized water which may be used in part wherever water is introduced into the process though obviously, most or all of it will be introduced at 24 to the leaching tank 22 where large quantities of water are required.

The anion exchangers 94 are regenerated as indicated at 98 by the introduction of sodium carbonate (or sodium hydroxide, depending upon the exchange material used) and the eluant from the regeneration and subsequent usual washing delivered at 100 then contains sodium fluoride and sodium carbonate suitable for return to the mixer 6 at 10 and precipitator 72 at 73, it being noted that to this mixer and precipitator fluoride ions would ordinarily be added and that the addition of sodium carbonate is also advantageous as described in the Kawecki patent. Most of the eluant at 100 is desirably returned to the precipitator 72 which also receives the stream at 74 and sodium carbonate at 76. The sodium carbonate thus received from 100 will reduce the streams at 74 and 76 to a minimum. Preference is given for the recovery of the fluorides in the anion exchanger eluants mostly by introduction to the precipitator because volatile fluorides are lost in the oven.

The cation exchangers 62 are regenerated with sulfuric acid as indicated at 102, and the eluant at 104 containing non-toxic excess acid and sodium sulphate can be disposed of to the usual waste system. Any fluorine content at this point is very minute and unobjectionable. Similarly the cation exchangers 90 are regenerated by sulfuric acid at 106 and provide an eluant at 108 of excess acid and sodium sulphate solution, likewise non-toxic.

In summary of the foregoing, it will be noted that the fluorine remains almost entirely in the system, getting rid of the problem of its removal from any waste. Furthermore, there is conservation of water in the system, there being produced substantially pure water which may be reintroduced, particularly for leaching.

For the introduction of iron inexpensive metallic iron or iron oxides may be used, and without involving sulfuric acid for its solution it is dissolved directly in the hydrofluoric acid which provides the necessary fluorine content along with the sodium fluoride introduced at 74 to the precipitator from the effluent 48. The overall result is a highly efficient process with elimination of the problems of waste disposal.

While reference has been made to the materials which are most economical (iron in the form of magnetite, and sodium salts), it will be evident that the alkali used may be potassium or ammonium compounds, while other heavy metal-alkali double fluorides of low solubility may be used in place of the sodium ferric fluoride as described in the Kawecki patent. Interchangeability of carbonates and hydroxides will also be evident.

It may be noted that the cation exchangers 90 and anion exchangers 94, constituting a demineralizer may be combined in the form of a double bed exchanger performing both functions, or a set of mixed bed exchangers may be used.

It will be clear from the foregoing that various changes in details may be made without departing from the invention as defined in the following claims.

What is claimed is:

1. A process for beryllium compounds recovery from a mixture containing an alkali-beryllium fluoride and insoluble materials including:
   dissolving in water the alkali-beryllium fluoride;
   separating the resulting solution from the insoluble materials;
   precipitating the beryllium compound from the resulting solution by an alkali and separating the precipitate;
   subjecting at least a part of the remaining solution to cation exchange to provide a solution containing hydrofluoric acid;
   treating a substance of the group consisting of iron and salts thereof with the hydrofluoric acid solution to produce iron fluoride; and
   reacting the iron fluoride with alkali fluoride to produce a precipitate of alkali-ferric fluoride.

2. A process according to claim 1 including the further steps of:
   removing the precipitate of alkali-ferric fluoride; and
   subjecting the remaining aqueous solution to demineralization by ion exchange to remove alkali and fluorine ions.

3. A process according to claim 2 in which at least part of the demineralized water is returned to effect said solution of alkali-beryllium fluoride.

4. A process according to claim 2 including the further steps of:
   regenerating the demineralizer; and
   passing at least part of the eluant containing fluorine ions from the regenerating step to the zone of reaction of the ferric fluoride with alkali fluoride.

5. A process according to claim 4 in which at least part of the demineralized water is returned to effect said solution of alkali-beryllium fluoride.

6. A process for beryllium compound recovery from a mixture containing an alkali-beryllium fluoride and insoluble materials including:
   dissolving in water the alkali-beryllium fluoride;
   separating the resulting solution from the insoluble materials;
   precipitating the beryllium compound from the resulting solution by an alkali and separating the precipitate;
   subjecting a part of the remaining solution to cation exchange to provide a solution containing hydrofluoric acid;
   treating a substance of the group consisting of iron and salts thereof with the hydrofluoric acid solution to produce iron fluoride; and
   reacting the iron fluoride with another part of the solution remaining from the precipitation of beryllium fluoride to produce a precipitate of alkali-ferric fluoride.

7. A process for removal of soluble ionizable fluoride from an aqueous solution thereof including:
   subjecting at least a part of said solution to cation exchange to provide a solution containing hydrofluoric acid;
   treating a substance of the group consisting of iron and salts thereof with the hydrofluoric acid solution to produce iron fluoride;
   reacting the iron fluoride with alkali fluoride to produce a precipitate of alkali-ferric fluoride;
   removing the precipitate of alkali-ferric fluoride; and
   subjecting the remaining aqueous solution to demineralization by ion exchange to remove alkali and fluorine ions.

8. A process for removal of soluble ionizable fluoride from an aqueous solution thereof including:
   subjecting at least a part of said solution to cation exchange to provide a solution containing hydrofluoric acid;
   precipitating fluorine from the hydrofluoric acid solution as a ferric fluoride complex;
   separation of the precipitate;
   removal of residual fluorine ions from the remaining aqueous solution by anion exchange in an anion exchanger;
   regenerating the last mentioned exchanger; and
   passing resulting eluant containing fluorine ions to the zone wherein fluorine is precipitated as a ferric fluoride complex.

9. A process for removal of soluble ionizable fluoride from an aqueous solution thereof including:
   subjecting at least a part of said solution to cation exchange to provide a solution containing hydrofluoric acid;
   precipitating fluorine from the hydrofluoric acid solution as a ferric fluoride complex;
   separation of the precipitate;
   treatment of the remaining aqueous solution by a cation exchanger operating on a hydrogen cycle;
   removal of residual fluorine ions from the aqueous solution resulting from the last treatment by anion exchange in an anion exchanger;
   regenerating the last mentioned exchanger; and
   passing resulting eluant containing fluorine ions to the zone wherein fluorine is precipitated as a ferric fluoride complex.

References Cited by the Examiner

UNITED STATES PATENTS 2,312,297  2/43  Kawecki _____ 23—21
2,892,679  6/59  Fuentevilla.

OTHER REFERENCES

Kunin et al.: "Ion Exchange Resins," pages 88–91, 94, 103 (1950), J. Wiley and Sons, New York.

Mellor: Comprehensive Treatise on Inorganic and Theoretical Chemistry, vol. 14, pages 3, 7, 8 (1935). Longmans, Green and Co., New York.

MAURICE A. BRINDISI, *Primary Examiner.*

GEORGE D. MITCHELL, *Examiner.*